United States Patent
Valente et al.

(10) Patent No.: US 10,571,008 B2
(45) Date of Patent: Feb. 25, 2020

(54) VEHICLE DRIVELINE COMPONENT HAVING A DIFFERENTIAL WITH ASYMMETRIC DIFFERENTIAL GEARING

(71) Applicant: AMERICAN AXLE & MANUFACTURING, INC., Detroit, MI (US)

(72) Inventors: Paul J. Valente, Berkley, MI (US); Douglas J. Chemelli, Royal Oak, MI (US); James P. Downs, South Lyons, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 4 days.

(21) Appl. No.: 16/048,410

(22) Filed: Jul. 30, 2018

(65) Prior Publication Data

US 2020/0032889 A1 Jan. 30, 2020

(51) Int. Cl.
*F16H 48/28* (2012.01)
*F16H 48/22* (2006.01)

(52) U.S. Cl.
CPC ............. *F16H 48/28* (2013.01); *F16H 48/22* (2013.01); *F16H 2048/282* (2013.01)

(58) Field of Classification Search
CPC ................................. F16H 48/08; F16H 48/28
See application file for complete search history.

(56) References Cited

U.S. PATENT DOCUMENTS

| | | | |
|---|---|---|---|
| 3,955,443 A | 5/1976 | Estrada | |
| 4,754,661 A * | 7/1988 | Barnett | F16H 48/28 475/236 |
| 6,083,133 A | 7/2000 | Dye | |
| 6,840,884 B2 * | 1/2005 | Wang | F16H 48/28 475/230 |
| 8,070,640 B2 * | 12/2011 | Radzevich | F16H 48/28 475/230 |
| 8,517,884 B2 | 8/2013 | Gelman et al. | |
| 8,978,503 B2 * | 3/2015 | Dort | B23F 5/20 74/423 |
| 9,574,650 B2 | 2/2017 | Fox | |
| 2017/0002909 A1 | 1/2017 | Sheen | |

* cited by examiner

*Primary Examiner* — Derek D Knight
(74) *Attorney, Agent, or Firm* — Harness, Dickey & Pierce, P.L.C.

(57) ABSTRACT

A vehicle driveline component having a limited slip differential with a differential gearset and a pair of clutch packs received in a differential case. The differential gearset employs side gears that are meshed with first differential pinions, which are mounted about a first pin axis, and second differential pinions, which are mounted about a second pin axis that is not perpendicular to the first pin axis. The teeth of the first differential pinions are formed with drive side having a first pressure angle. The teeth of the second differential pinions are formed with a coast side having a second pressure angle that is different from the first pressure angle. The teeth of the side gears are asymmetric and have a first side, which is formed with the first pressure angle, and a second side that is formed with the second pressure angle.

18 Claims, 6 Drawing Sheets

VEHICLE DRIVELINE COMPONENT HAVING A DIFFERENTIAL WITH ASYMMETRIC DIFFERENTIAL GEARING

FIELD

The present disclosure relates to a vehicle driveline component having a limited slip differential with asymmetric differential gearing.

BACKGROUND

This section provides background information related to the present disclosure which is not necessarily prior art.

In some vehicle driveline components that have a differential, it can be desirable to configure the differential with a first torque bias ratio (TBR) that is associated with a drive condition, in which rotary power is input to the differential through a differential case and output through a pair of side gears, and a second TBR that is associated with a coast condition in which rotary power is input to the differential through the side gears and output through the differential case. It is known to change the TBR in a limited slip differential using a mechanism for controlling or limiting the compression of the clutch pack(s) and/or using complex friction materials within the clutch pack(s) to provide different TBR's in the drive and coast conditions. These solutions can be relatively complex, costly and/or difficult to manufacture. Accordingly, there is a need in the art for a relatively less complex, less costly and more easily manufactured differential having different TBR's associated with the drive and coast conditions.

SUMMARY

This section provides a general summary of the disclosure, and is not a comprehensive disclosure of its full scope or all of its features.

In one form, the present disclosure provides a vehicle driveline component having a differential case, and a differential gearset. The differential case is rotatable about a differential axis and defines a case cavity. The differential gearset is received in the case cavity and includes a plurality of first differential pinions, a plurality of second differential pinions and a pair of side gears. The first differential pinions have first pinion teeth and are coupled to the differential case for rotation about a first differential pinion axis that is perpendicular to the differential axis. The second differential pinions have second pinion teeth and are coupled to the differential case for rotation about a second differential pinion axis that is perpendicular to the differential axis but non-perpendicular to the first differential pinion axis. Each of the side gears is rotatable about the differential axis and has side gear teeth that are meshingly engaged with the first and second pinion teeth. The side gear teeth are asymmetric and have a first side and a second side. The teeth of the first pinions and the first side of the teeth of the side gears have a first pressure angle, while the teeth of the second pinions and the second side of the teeth of the side gears have a second pressure angle that is different from the first pressure angle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
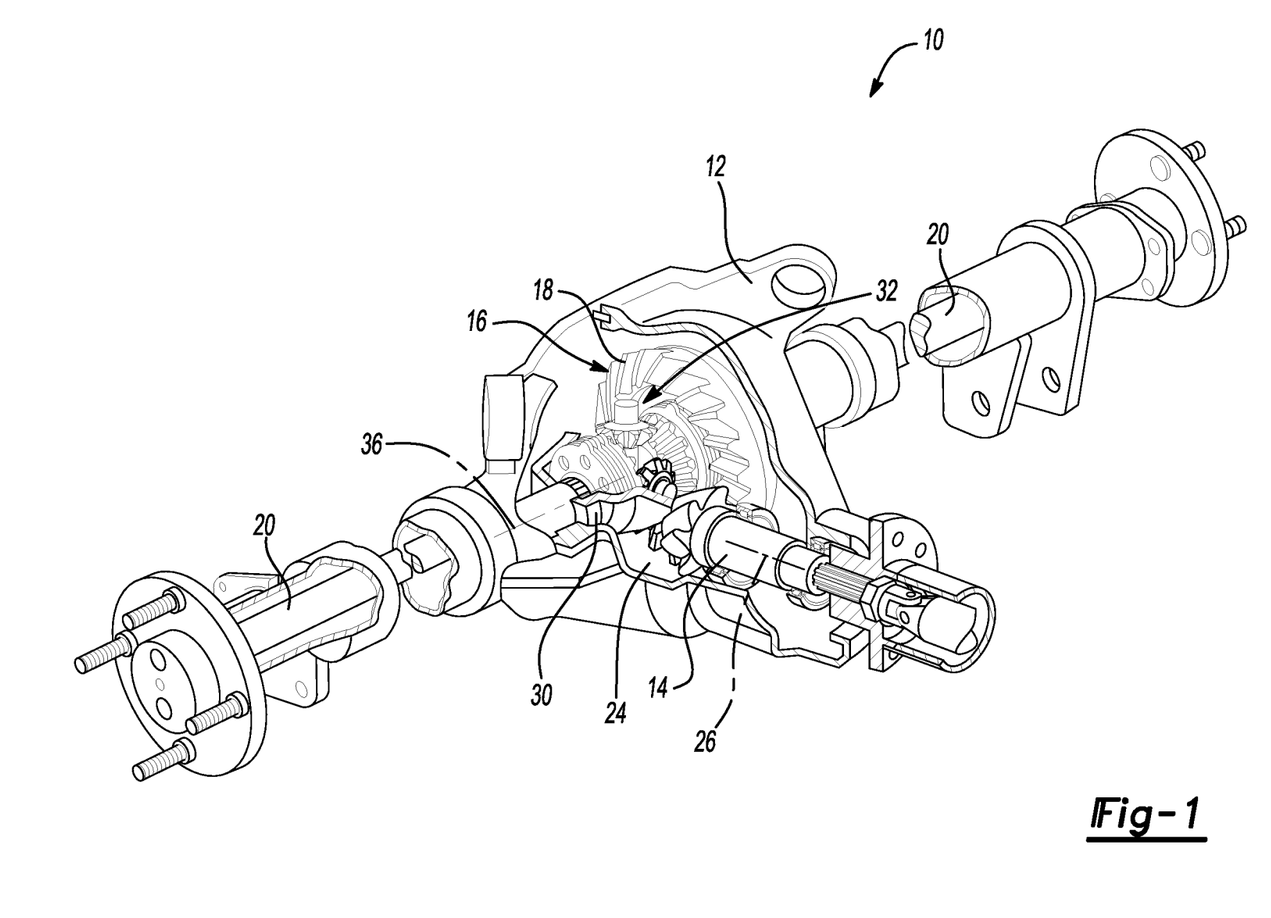
FIG. 1 is a perspective, partly sectioned view of an exemplary vehicle driveline component constructed in accordance with the teachings of the present disclosure.

With reference to FIG. 1, an exemplary vehicle driveline component constructed in accordance with the teachings of the present disclosure is generally indicated by reference numeral 10. In the particular example provided, the vehicle driveline component 10 is a rear axle assembly, but it will be appreciated that the teachings of the present disclosure can be employed in various other vehicle driveline components, including front axle assemblies, transfer cases, center differentials and power take-off units. The vehicle driveline component 10 can include a housing 12, an input pinion 14, a limited slip differential 16, a ring gear 18, and a pair of output shafts 20.

The housing 12 can define a differential cavity 24 into which the input pinion 14, the limited slip differential 16, and the ring gear 18 can be received. The housing 12 can support the input pinion 14 for rotation about an input pinion axis 26.

Figure 2:
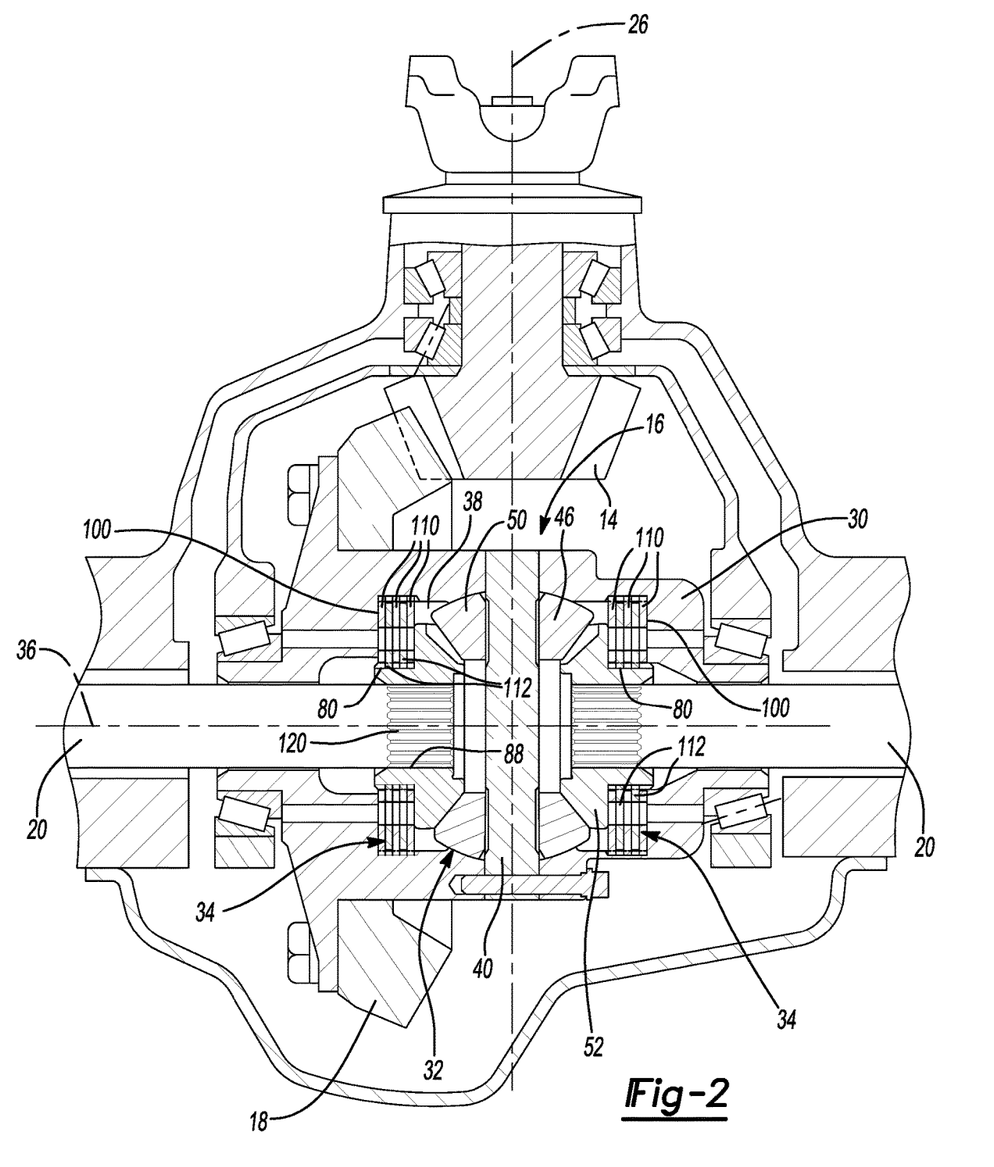
FIG. 2 is a section view taken through the vehicle driveline component of FIG. 1.
Figure 3:
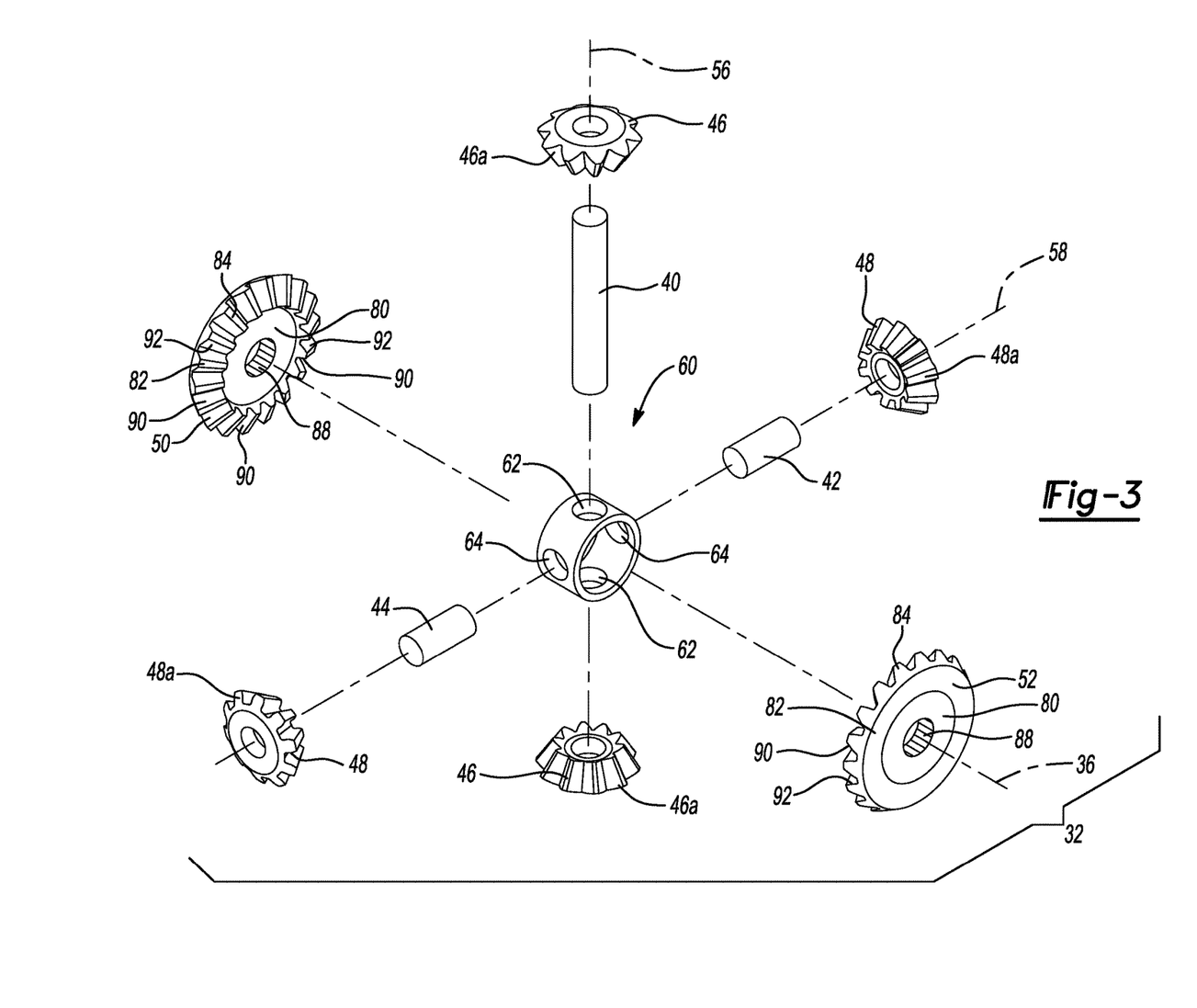
FIG. 3 is an exploded perspective view of a portion of the vehicle driveline component of FIG. 1, illustrating a differential gearset of a limited slip differential in more detail.

With reference to FIGS. 2 and 3, the limited slip differential 16 can include a differential case 30, a differential gearset 32 and a pair of clutch packs 34. The differential case 30 can be supported by the housing 12 for rotation about a differential axis 36 that can be transverse to the input pinion axis 26. The differential case 30 defines a case cavity 38 into which the differential gearset 32 and the clutch packs 34 can be received.

Figure 4:
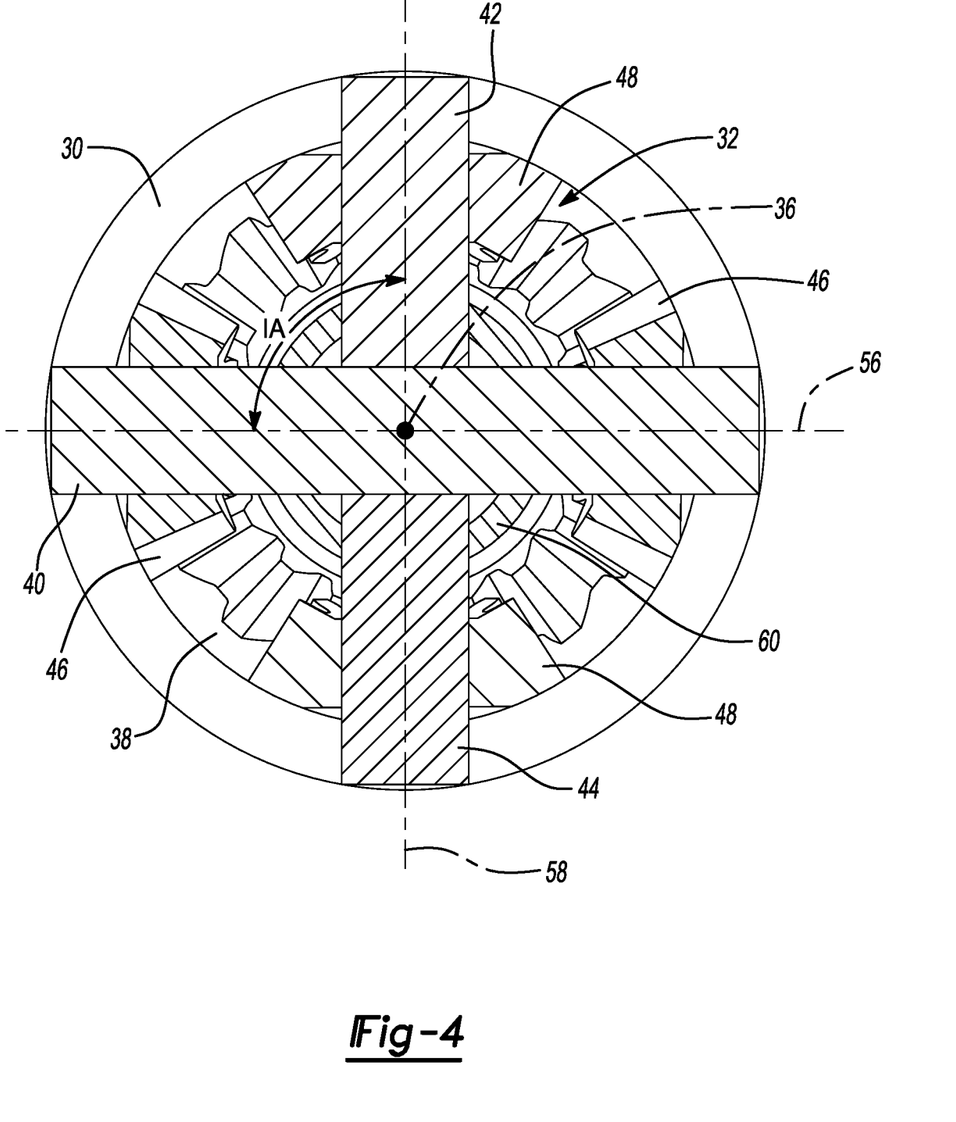
FIG. 4 is a section view of a portion of the vehicle driveline component of FIG. 1, illustrating a portion of the limited slip differential in more detail.

With reference to FIGS. 3 and 4, the differential gearset 32 can include a first pin 40, a second pin 42, a third pin 44, a plurality of first differential pinions 46, a plurality of second differential pinions 48, a first side gear 50 and a second side gear 52. The first pin 40 can be fixedly mounted to the differential case 30 so as to extend through the case cavity 38 along a first pin axis 56 that is perpendicular to the differential axis 36. The second and third pins 42 and 44 can be fixedly mounted to the differential case 30 and can extend along a second pin axis 58 that is perpendicular to the differential axis 36 but non-perpendicular to the first pin axis 56. An included angle IA (i.e., the smallest angle) between the first pin axis 56 and the second pin axis 58 is selected in conjunction with the configuration of the teeth of the first differential pinions 46, the configuration of the teeth of the second differential pinions 48 and the configuration of the teeth of the first and second side gears 50 and 52 to provide sufficient backlash so that rotary power transmitted in a drive condition (i.e., in a predetermined rotational direction from the differential case 30 to the first and second side gears 50 and 52) is accomplished through meshing engagement of the first differential pinions 46 and the first and second side gears 50 and 52, and rotary power transmitted in coast condition (i.e., in the predetermined rotational direction from the first and second side gears 50 and 52 to the differential case 30) is accomplished through meshing engagement of the second differential pinions 48 and the first and second side gears 50 and 52. The included angle IA is greater than or equal to 85 degrees and less than 90 degrees, but we anticipate the included angle IA would be greater than or equal to 88 degrees and less than 90 degrees in most situations. The second and third pins 42 and 44 could be supported on their interior ends in any desired manner. For example, the interior ends of the second and third pins 42 and 44 could interlock or engage with the first pin 40. In the example provided, an annular collar or sleeve 60 is disposed in the case cavity 38. The sleeve 60 has a first set of holes 62 through which the first pin 40 is received, and a set of second holes 64 that are each configured to receive an associated one of the second and third pins 42 and 44. If desired, the second and third pins 42 and 44, and optionally the first pin 40, can be fixedly coupled to the sleeve 60, for example via a roll pin (not specifically shown).

Figure 5:
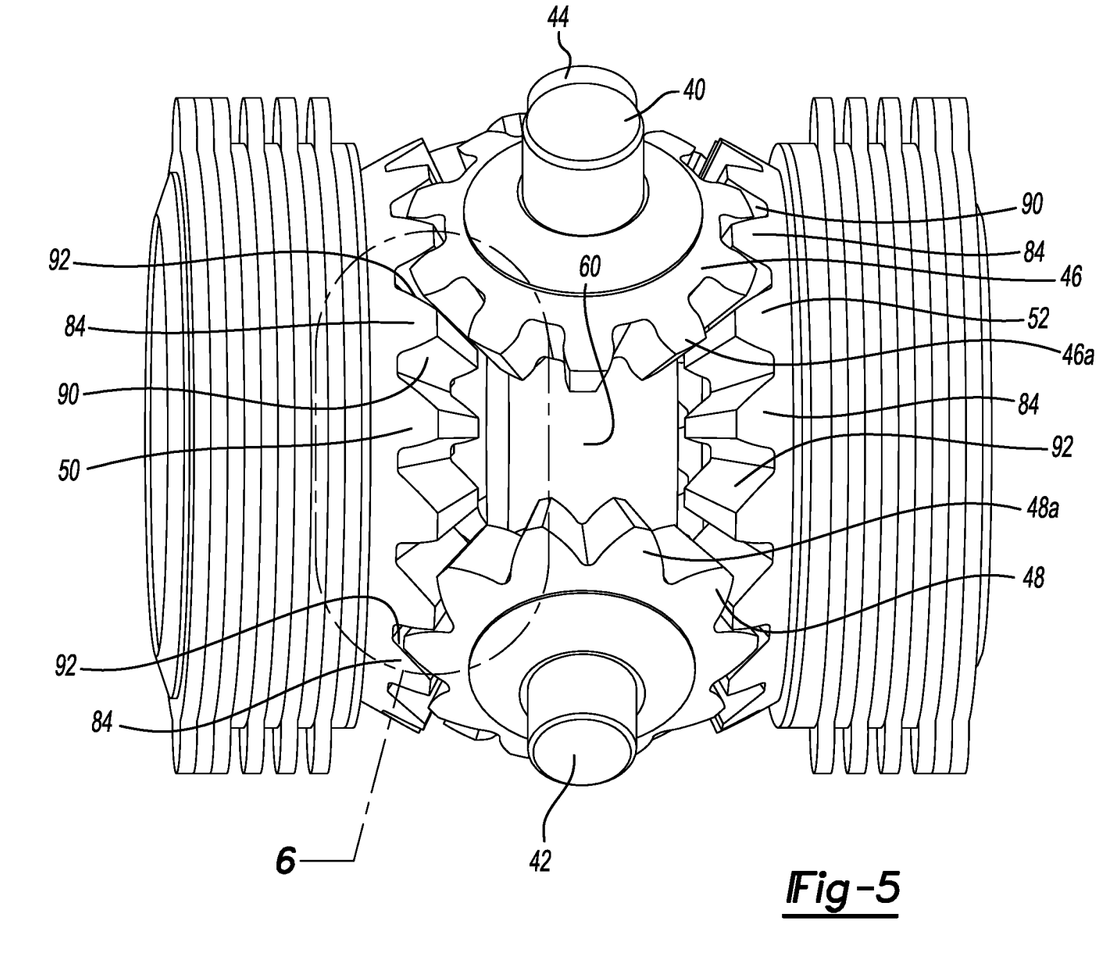
FIG. 5 is a perspective view of a portion of the limited slip differential illustrating the differential gearset in more detail.
Figure 6:
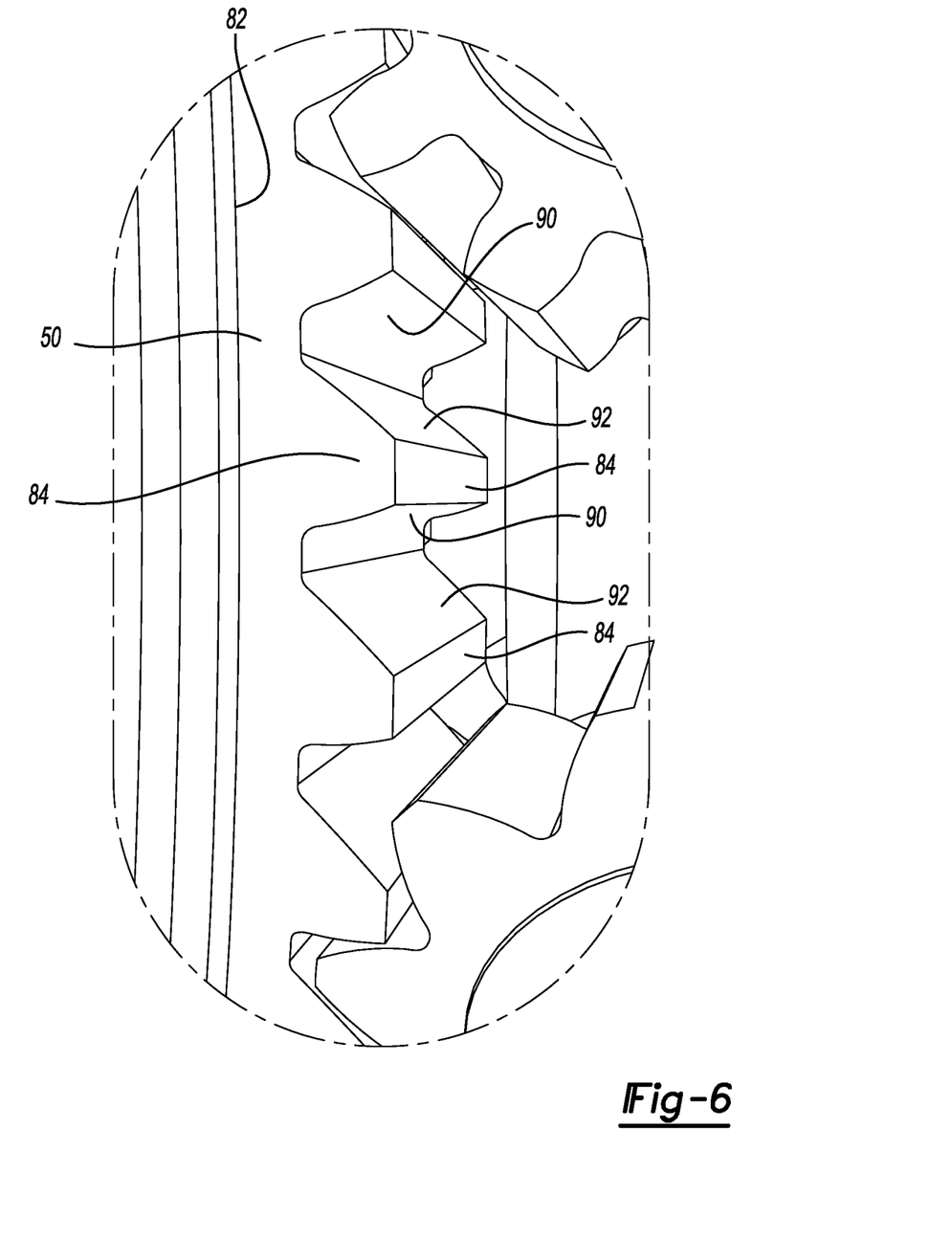
FIG. 6 is an enlarged portion of FIG. 5 illustrating the asymmetric configuration of a side gear in the differential gearset.

With reference to FIGS. 2, 3 and 5, the first differential pinions 46 are straight bevel gears with first pinion teeth 46a and are rotatably mounted on the first pin 40 radially between the sleeve 60 and the interior wall of the differential case 30. Similarly, the second differential pinions 48 are straight bevel gears with second pinion teeth 48a. A first one of the second differential pinions 48 is rotatably mounted on the second pin 42 radially between the sleeve 60 and the interior wall of the differential case 30, while the other one of the second differential pinions 48 is rotatably mounted on the third pin 44 radially between the sleeve 60 and the interior wall of the differential case 30.

With reference to FIGS. 2, 3, 5 and 6, the first and second side gears 50 and 52 can be identical in their configuration. The first and second side gears 50 and 52 can have a hub portion 80 and a gear portion 82 that has side gear teeth 84 and is fixedly coupled to (e.g., integrally formed with) the hub portion 80. The hub portion 80 can define an internally splined aperture 88. The side gear teeth 84 are asymmetric, having a first side 90 and a second side 92. The first side 90 of the side gear teeth 84 and the teeth 46a of the first pinions 46 are formed with a first pressure angle, while the second side 92 of the side gear teeth 84 and the teeth 48a of the second pinions 48 are formed with a second pressure angle that is different from the first pressure angle. Each of the first and second side gears 50 and 52 is rotatable within the case cavity 38 about the differential axis 36 and is meshingly engaged with the first and second differential pinions 46 and 48 (i.e., the side gear teeth 84 of the first and second side gears 50 and 52 are meshingly engaged with the first pinion teeth 46a of the first differential pinions 46 and are meshingly engaged with the second pinion teeth 48a of the second differential pinions 48).

Returning to FIG. 2, each of the clutch packs 34 can be received in the case cavity 38 between an annular wall 100 on the differential case 30 and an associated one of the first and second side gears 50 and 52. Each of the clutch packs 34 has a plurality of first clutch plates 110 and at least one-second clutch plate 112. The first clutch plates 110 can be interleaved with the second clutch plate(s) 112. The first clutch plates 110 can be axially slidably but non-rotatably coupled to one of the differential case 30 and a corresponding one of the first and second side gears 50 and 52, while the second clutch plate(s) 112 can be axially slidably but non-rotatably coupled to the other one of the differential case 30 and the corresponding one of the first and second side gears 50 and 52. In the example provided, the differential case 30 defines a plurality of slots (not specifically shown) that are disposed in the case cavity 38 concentrically about the differential axis 36, the first clutch plates 110 have tabs (not specifically shown) that are received into the slots formed into the differential case 30, the hub portion 80 of each of the first and second side gears 50 and 52 has a toothed or male splined segment (not specifically shown), the second clutch plates 112 have a female toothed or splined aperture (not specifically shown), and a plurality of the second clutch plates 112 are received onto the hub portion 80 of each of the first and second side gears 50 and 52 such that the male splined segments are received through and meshingly engaged with the female splined apertures of the second clutch plates 112.

The ring gear 18 can be fixedly coupled to the differential case 30 for rotation about the differential axis 36 and can be meshingly engaged to the input pinion 14. In the example provided, the ring gear 18 and the input pinion 14 are hypoid gears, but it will be appreciated that they could have a different tooth configuration, such as a spiral bevel configuration.

Each of the output shafts 20 can have a male-splined segment 120 that can be meshingly engaged to the internally splined aperture 88 in the hub portion 80 of an associated one of the first and second side gears 50 and 52. The output shafts 20 are configured to transmit rotary power to an associated drive wheel of a vehicle.

With reference to FIGS. 2, 3, 5 and 6, rotary power can be input to the limited slip differential 16 via the input pinion 14 and the ring gear 18 during operation of the vehicle driveline component 10 to drive the differential case 30 in the predetermined rotational direction. Due to orientation of the first and second pin axes 56 and 58, and the backlash between the teeth 48a of the second pinions 48 and the first side 90 of the teeth 84 of the first and second side gears 50 and 52, rotary power is transmitted through the gear teeth 46a of the first differential pinions 46 to the first side 90 of the side gear teeth 84 of the first and second side gears 50 and 52 to drive (i.e., rotate) the output shafts 20 in the predetermined rotational direction. It will be appreciated that the configuration of the gear teeth 48a on the second differential pinions 48 and the included angle IA are selected to ensure that the second differential pinions 48 do not participate in the transmission of rotary power between the differential case 30 and the first and second side gears 50 and 52 when rotary power sufficient to drive the output shafts 20 in the predetermined rotational direction is provided to the differential case 30 through the input pinion 14 (i.e., the drive condition). It will also be appreciated that thrust loads will be generated (due to the bevel configuration of the teeth 46a of the first differential pinions 46 and the first and second side gears 50 and 52) during the transmission of rotary power between the first differential pinions 46 and the first and second side gears 50 and 52, and that these thrust loads will tend to force the first and second side gears 50 and 52 along the differential axis 36 in directions away from one another and so as to compress the clutch packs 34 between an associated one of the annular walls 100 on the differential case 30 and an associated one of the first and second side gears 50 and 52. The magnitude of each of the forces that are generated is based in part on the magnitude of the torque that is transmitted between the first differential pinions 46 and a respective one of the first and second side gears 50 and 52, as well as the first pressure angle (i.e., the pressure angle associated with the teeth 46a of the first pinions 46 and the first side 90 of the teeth 84 of the first and second side gears 50 and 52).

When rotary power is input to the limited slip differential 16 in the predetermined rotational direction via the output shafts 20 (i.e., when the vehicle driveline component 10 is coasting and the limited slip differential 16 is "back driven" by the output shafts 20), rotary power is transmitted from the first and second side gears 50 and 52 to the second differential pinions 48 due to the orientations of the first and second pin axes 56 and 58 and the backlash between the teeth 46a of the first pinions 46 and the teeth 84 of the first and second side gears 50 and 52. In this regard, the rotary power is transmitted between the first and second side gears 50 and 52 and the second differential pinions 48 in the coast condition, but the first differential pinions 46 do not participate in the transmission of rotary power between the first and second side gears 50 and 52 and the first differential pinions 46 when rotary power sufficient to back drive the limited slip differential 16 in the predetermined rotational direction is input to the limited slip differential 16 via the output shafts 20. It will be appreciated that thrust loads will be generated (due to the bevel configuration of the teeth 48a of the second differential pinions 48 and the first and second side gears 50 and 52) during the transmission of rotary power between the first and second side gears 50 and 52 and the second differential pinions 48, and that these thrust loads will tend to force the first and second side gears 50 and 52 along the differential axis 36 in directions away from one another and so as to compress the clutch packs 34 between an associated one of the annular walls 100 on the differential case 30 and an associated one of the first and second side gears 50 and 52. The magnitude of each of the forces that are generated is based in part on the magnitude of the torque that is transmitted between the second differential pinions 48 and a respective one of the first and second side gears 50 and 52, as well as the second pressure angle (i.e., the pressure angle associated with the teeth 48a of the second pinions 48 and the second side 92 of the teeth 84 of the first and second side gears 50 and 52).

In view of the above discussion, it will be appreciated that the first pressure angle can be selected to provide a first torque bias ratio, while the second pressure angle can be selected to provide a second torque bias ratio that is different from the first torque bias ratio.

While the vehicle driveline component 10 has been described herein as having a limited slip differential 16, it will be appreciated that the teachings of the present disclosure have broader application. In this regard, the teachings of the present disclosure could be employed in an open differential (i.e., a differential similar to the limited slip differential 16 but with merely a pair of thrust washers in lieu of the clutch packs). In this alternate example, the different levels of thrust that are generated due to the differences between the first and second pressure angles generate proportionally different frictional drag forces between the thrust washers and the first and second side gears 50 and 52.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline component comprising:
    a differential case that is rotatable about a differential axis, the differential case defining a case cavity; and
    a differential gearset received in the case cavity, the differential gearset comprising a plurality of first differential pinions, a plurality of second differential pinions and a pair of side gears, the first differential pinions having first pinion teeth and being coupled to the differential case for rotation about a first differential pinion axis that is perpendicular to the differential axis, the second differential pinions having second pinion teeth and being coupled to the differential case for rotation about a second differential pinion axis that is perpendicular to the differential axis but non-perpendicular to the first differential pinion axis, each of the side gears being rotatable about the differential axis and having side gear teeth that are meshingly engaged with the first and second pinion teeth;
    wherein the side gear teeth are asymmetric and have a first side, and a second side wherein the teeth of the first pinions and the first side of the teeth of the side gears have a first pressure angle, and wherein the teeth of the second pinions and the second side of the teeth of the side gears have a second pressure angle that is different from the first pressure angle.

2. The vehicle driveline component of claim 1, further comprising a ring gear fixedly coupled to the differential case.

3. The vehicle driveline component of claim 2, wherein the ring gear is a spiral bevel gear.

4. The vehicle driveline component of claim 3, wherein the ring gear is a hypoid gear.

5. The vehicle driveline component of claim 2, further comprising:
    a housing defining a differential cavity into which the differential case is received, the housing supporting the differential case for rotation about the differential axis; and
    a pinion received in the housing and extending into the differential cavity, the pinion being rotatable about a pinion axis that is transverse to the differential axis and being meshingly engaged with the ring gear.

6. The vehicle driveline component of claim 1, further comprising a first pin mounted to the differential case, and wherein the first differential pinions are rotatably received on the first pin.

7. The vehicle driveline component of claim 6, further comprising at least one second pin, the at least one second pin being mounted to the differential case, wherein at least one of the second differential pinions is rotatably received on the at least one second pin.

8. The vehicle driveline component of claim 7, further comprising a pin holder received in the case cavity, the pin holder being received on the first pin between the first differential pinions, each of the at least one second pins being mounted to the sleeve.

9. The vehicle driveline component of claim 8, wherein the pin holder is a hollow sleeve having a first set of holes, through which the first pin is received, and a second set of holes that receive the second pins.

10. The vehicle driveline component of claim 1, further comprising a pair of clutch packs, each of the clutch packs being received in the case cavity between the differential case and an associated one of the side gears, each of the clutch packs having a plurality of first clutch plates and at least one second clutch plate, the first clutch plates being interleaved with the at least one second clutch plate, the first clutch plates being axially slidably but non-rotatably coupled to one of the differential case and a corresponding one of the side gears, the at least one second clutch plate being axially slidably but non-rotatably coupled to the other one of the differential case and the corresponding one of the side gears.

11. The vehicle driveline component of claim 10, further comprising a ring gear fixedly coupled to the differential case.

12. The vehicle driveline component of claim 11, wherein the ring gear is a spiral bevel gear.

13. The vehicle driveline component of claim 12, wherein the ring gear is a hypoid gear.

14. The vehicle driveline component of claim 11, further comprising:

a housing defining a differential cavity into which the differential case is received, the housing supporting the differential case for rotation about the differential axis; and a pinion received in the housing and extending into the differential cavity, the pinion being rotatable about a pinion axis that is transverse to the differential axis and being meshingly engaged with the ring gear.

15. The vehicle driveline component of claim 10, further comprising a first pin mounted to the differential case, and wherein the first differential pinions are rotatably received on the first pin.

16. The vehicle driveline component of claim 15, further comprising at least one second pin, the at least one second pin being mounted to the differential case, wherein at least one of the second differential pinions is rotatably received on the at least one second pin.

17. The vehicle driveline component of claim 16, further comprising a pin holder received in the case cavity, the pin holder being received on the first pin between the first differential pinions, each of the at least one second pins being mounted to the sleeve.

18. The vehicle driveline component of claim 17, wherein the pin holder is a hollow sleeve having a first set of holes, through which the first pin is received, and a second set of holes that receive the second pins.

* * * * *